United States Patent [19]

Grossmann et al.

[11] Patent Number: 4,559,857

[45] Date of Patent: Dec. 24, 1985

[54] INDEXING ARRANGEMENT FOR THE TABLE OF A CHOP SAW

[75] Inventors: Horst Grossmann, Hünfelden; Rainer Herting, Langenhahn; Horst Kaiser, Gräbengasse, all of Fed. Rep. of Germany

[73] Assignee: Black & Decker Inc., Newark, Del.

[21] Appl. No.: 650,899

[22] Filed: Sep. 14, 1984

[30] Foreign Application Priority Data

Sep. 27, 1983 [DE] Fed. Rep. of Germany ... 8327663[U]

[51] Int. Cl.[4] ........ B27B 5/18

[52] U.S. Cl. ........ 83/471.3; 83/477.2; 83/490

[58] Field of Search ........ 83/471.3, 477.2, 478, 83/490, 581

[56] References Cited

U.S. PATENT DOCUMENTS

| | | | |
|---|---|---|---|
| 2,208,582 | 7/1940 | Hollister | 83/471.3 |
| 2,374,806 | 5/1945 | Cicchetti et al. | 83/490 X |
| 3,623,516 | 11/1971 | Kirk . | |
| 3,821,918 | 7/1974 | Niehaus et al. | 83/490 X |
| 3,946,631 | 3/1976 | Malm . | |
| 3,998,121 | 12/1976 | Bennett | 83/471.3 |
| 4,152,961 | 5/1979 | Batson | 83/471.3 |

FOREIGN PATENT DOCUMENTS

| | | |
|---|---|---|
| 445065 | 9/1972 | Australia . |
| 1547438 | 6/1979 | United Kingdom . |

*Primary Examiner*—Frank T. Yost

*Attorney, Agent, or Firm*—Ronald B. Sherer; Edward D. Murphy; Harold Weinstein

[57] ABSTRACT

A chop saw has a saw unit connected pivotally about a horizontal axis to a turntable mounted rotatably in a base plate about a vertical axis. An indexing mechanism for locating rotational positions of the turntable comprises catch recesses on the underside of the turntable along a circular arc. A leaf spring is mounted on the base plate and has a free end engageable in the catch recesses upon rotation of the turntable. A release element is movably mounted in the base plate and operable to flex the leaf spring to move the free end thereof out of engagement with any catch recess engaged thereby. Advantageously the leaf spring and the base plate may be integrally molded or cast. Also, the catch recesses may conveniently be formed during casting or molding of the turntable.

14 Claims, 3 Drawing Figures

INDEXING ARRANGEMENT FOR THE TABLE OF A CHOP SAW

FIELD OF THE INVENTION

This invention relates to chop saws having a saw unit pivotally mounted on a rotatable turntable. The invention particularly relates to indexing arrangements for indexing relative rotational positions of the turntable.

BACKGROUND OF THE INVENTION

Indexing or catch mechanisms in chop saws serve to determine miter adjustments of the saw blade for prescribed miter angles, so that the adjustment of these miter angles is simplified. For this purpose, it is known to employ in a chop saw a ball-spring arrangement, wherein the spring and the ball are inserted into a bore in the surface of a base plate, on which the turntable is rotatably mounted, adjacent the circumferential surface of the turntable. The spring presses the ball against the outer circumferential surface of the turntable. Cavities are present in this circumferential surface and into which the ball can engage, so as to effect indexing of the turntable relative to the base plate.

This arrangement is comparatively complicated to manufacture, because it not only requires the construction of recesses in the external circumferential surface of the turntable, but also the production of a bore in the base plate to accommodate the spring and ball. Also, it involves a comparatively complicated assembly step whereby the spring and ball have to be inserted into this bore, and the turntable then assembled to the base plate in a manner to prevent the ball from coming out of the bore. Furthermore, the catch positions obtainable are not always stable, so that in use a misadjustment can easily occur.

SUMMARY OF THE INVENTION

It is an object of the present invention to provide a chop saw with an indexing mechanism of simple construction and relatively simple to assemble during manufacture.

A feature by which this object is achieved is by providing catch recesses on the underside of the turntable along an arc, and releasably engaging these recesses by a resilient arm mounted on the base plate.

Accordingly, therefore, there is provided by the present invention a chop saw comprising a saw unit connected pivotably about a horizontal axis to a turntable mounted rotatably in a base plate about a vertical axis, and an indexing mechanism for releasably indexing the turntable in selected positions relative to the base plate. The indexing mechanism comprises catch recesses provided on the underside of the turntable along a circular arc, the center of the arc lying on the vertical axis; a leaf spring mounted on the base plate and having a free end which is engageable with any selected one of the catch recesses upon rotation of the turntable; and a release element mounted in the base plate and accessible from the exterior thereof, and operable to flex the leaf spring to move the free end out of engagement with any catch recess engaged thereby.

Advantageously, the leaf spring and the base plate may be integral and may be produced in one operation such as molding or casting.

Furthermore, the catch recesses on the underside of the turntable may be constructed simultaneously with the production of the turntable. For example, if the turntable is produced by the pressure casting process from aluminum, then the catch recesses may be constructed during the pressure casting, without a particular or additional operation being necessary for that purpose.

A catch pin is preferably mounted at the free end of the leaf spring for engagement in the catch recessess. Preferably the catch pin is made of metal so that abrasion resulting from movement thereof from one catch recess to another is minimal.

Preferably the release element is elongate and reciprocally slidable in spaced apart apertures in the base plate, and may have a forked end engaging around the catch pin.

Other objects, features and advantages of the present invention will become more fully apparent from the following detailed description of the preferred embodiment, the appended claims and the accompanying drawings.

DETAILED DESCRIPTION OF THE PREFERRED EMBODIMENT

Figure 1:
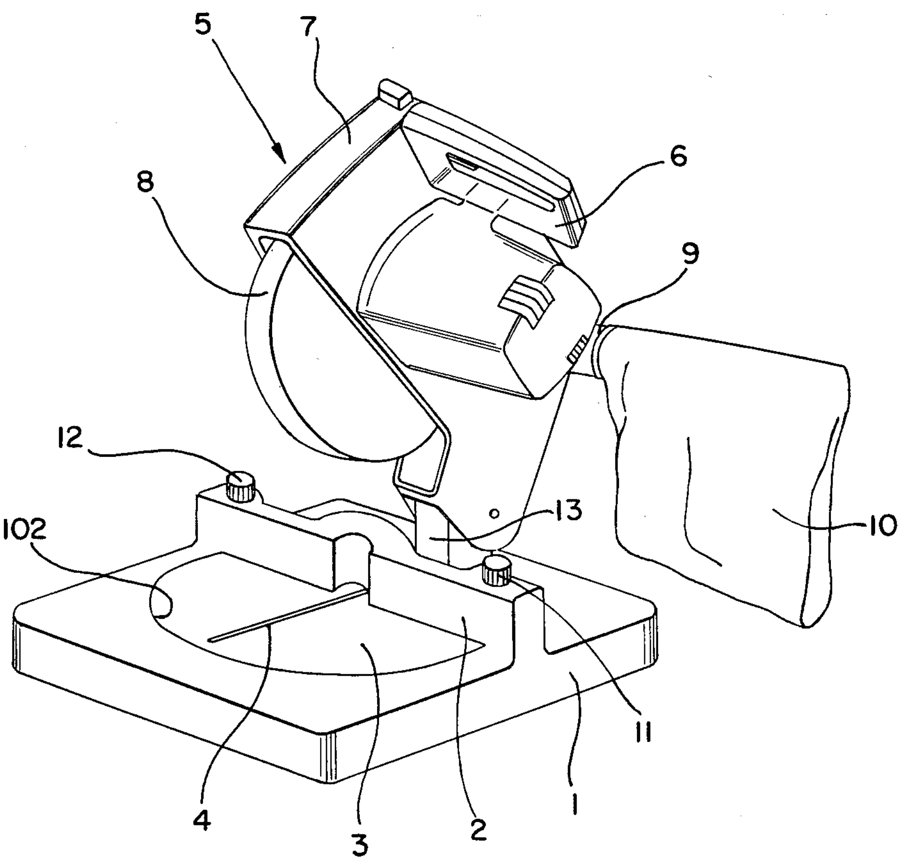
FIG. 1 shows a perspective view of a chop saw embodying the present invention.

The chop saw illustrated in FIG. 1 has a base plate 1 with a central circular recess 102 across which a stop 2 extends and is constructed integrally with the base plate 1. A stub shaft 31 (see FIG. 3) is supported in a central hub 20 of the base plate 1. The upper end of the shaft 31 is engaged in a central hub 32 extending downwardly from a turntable 3, the hub 32 being rotatable on the shaft 31 whereby the turntable 3 is rotatably mounted in the central recess of the base plate 1. A mounting block 13, on which a saw unit 5 is pivotally mounted, is secured to the turntable on a mounting pad 33 (see FIG. 2). The saw unit has a housing 7 accommodating an electric drive motor for the rotation of a circular saw blade, not shown, and also has a handle 6. A sawdust collecting bag 10 is mounted on an outlet pipe connector 9 provided on one side of the housing 7. In the raised rest position illustrated in FIG. 1, the saw blade is covered by a blade guard 8, which is automatically pivoted relative to the housing when the saw unit 5 is pivoted about the block 13 downwards into the work position, so that the rotating saw blade is exposed and can be brought into cutting engagement with a workpiece present on the turntable 3 and generally abutting the stop 2. To permit the saw unit 5 to be lowered completely, and workpieces to be parted by means of the saw blade, a slot 4 is formed in the turntable 3 and into which slot the rotating saw blade can penetrate.

In order to anchor the turntable 3, and hence the saw unit 5, in a predetermined angular position relative to the stop 2, rotatable clamping members 11 and 12 pass through vertical bores in the stop 2 and can be brought into clamping engagement with the top surface of the turntable 3 adjacent the periphery thereof.

Figure 2:
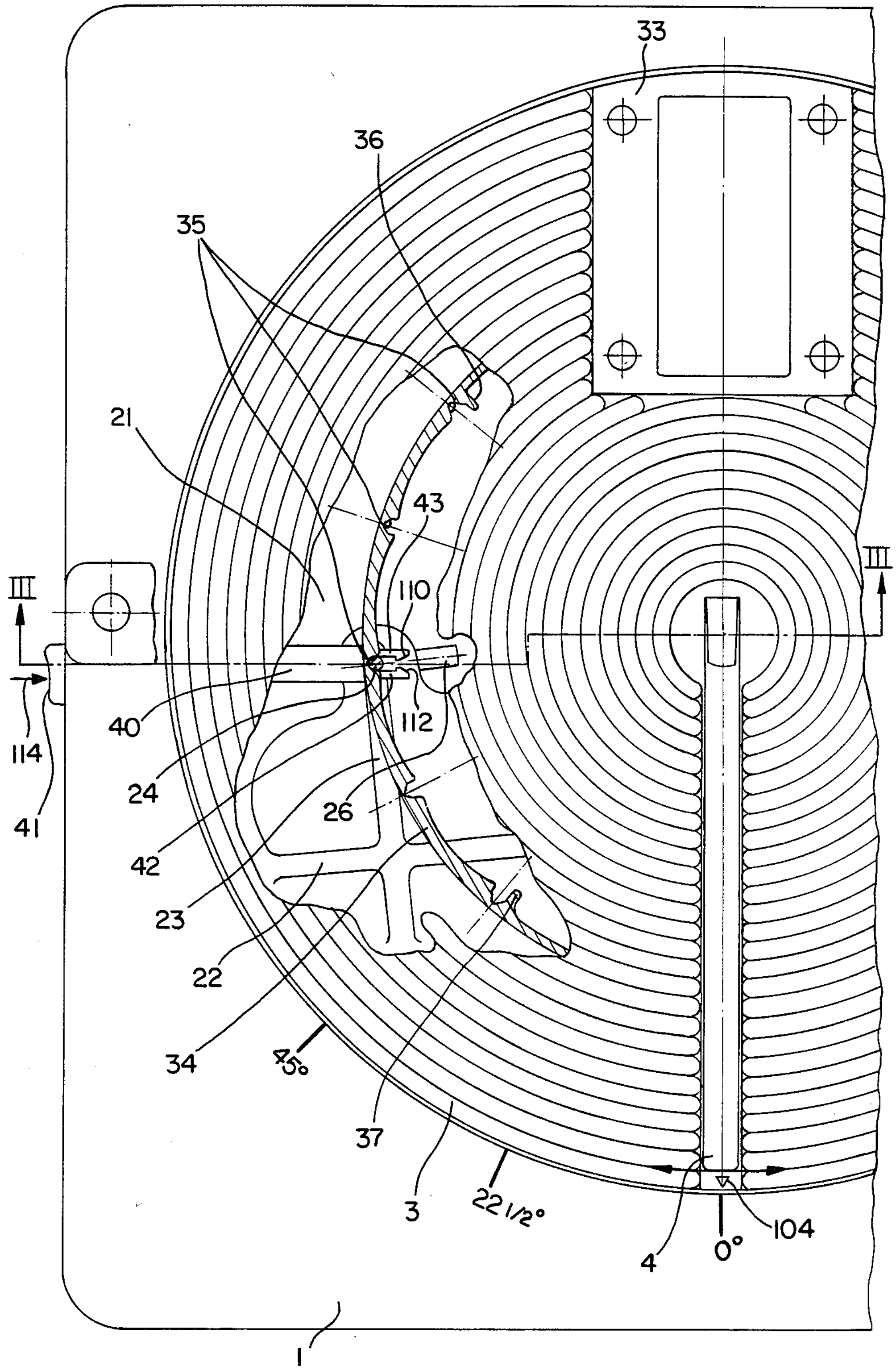
FIG. 2 shows a partial plan view of the base plate and the turntable of the chop saw of FIG. 1, a region of the turntable being shown fragmented with some exposed parts of the turntable in section.
Figure 3:
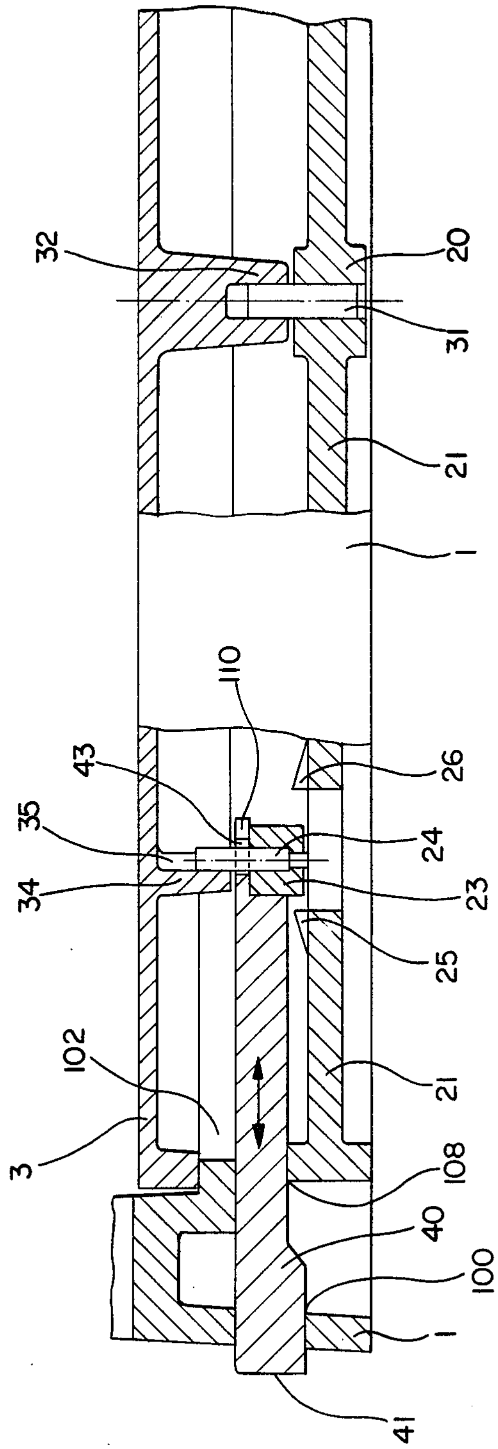
FIG. 3 shows partly an elevation and partly a section along the staggered line III—III of FIG. 2.

As can be seen from FIGS. 2 and 3, the base plate 1 has a bottom wall 21, forming the bottom of the central recess 102, on which an upwardly extending rib 22 is integrally formed. A flexible arm 23, functioning as a leaf spring, extends in cantilever manner from one side of this rib and is formed integrally with the rib 22. A catch pin 24 made of metal is firmly inserted vertically into the distal end region of the cantilevered leaf spring 23. This catch pin 24 extends from the free end of the leaf spring 23 upwards towards the turntable 3.

An annular rib 34 arranged concentrically relative to the bolt 31, and extending downwards towards the bottom wall 21 of the base plate 1, is integrally formed on the underside of the turntable 3 and helps reinforce the latter. Catch recesses 35, which are provided radially on the inside of this annular rib 34, are formed during the production of the turntable 3 and annular rib 34. To this end, the turntable 3 can be manufactured as an alloy casting, although it could be molded from suitable plastic material. The catch recesses 35 are located at prescribed angular intervals along the rib 34, and the different angles are marked on the base plate 1 (see FIG. 2). Limit stops 36 and 37, respectively, are formed on the circumferential outer sides of the two extreme catch recesses 35, which are spaced apart 90°, so that the turntable 3 can be rotated through a maximum of ±45° out of the central position shown in FIG. 2. An indicating mark 104 on the turn table 3 at the outer end of the slot 4 cooperates with the angular markings on the base plate 1.

The leaf spring 23 is oriented substantially along a tangent to the annular rib 34, and the catch pin 24 may, as FIG. 2 shows, be brought into engagement with a catch recess 35. In order to prevent excessive pivoting or flexing of the leaf spring 23, stops 25, 26 formed on the top surface of the bottom wall 21 of the base plate 1 limit the deflexion of the leaf spring 23 in a plane parallel to the surface of the turntable 3.

An elongate push rod 40, serving as a release element, the handle end 41 of which extends outside the base plate 1, is guided through two spaced apart orifices 106, 108 in the base plate 1. The inner end of the push rod 40, opposite the handle end 41, is bifurcate and the two fork prongs 42, 43 have inwardly directed retaining projections 110, 112 on their facing sides, the space between these projections being smaller than the diameter of the catch pin 24. The fork prongs 42, 43 are slid over the catch pin 24, so that the fork is widened resiliently and the catch pin 24 passes into the region between the projections 110, 112 and the fork bottom, and is releasably retained therein by the pair of projections 110, 112 (see FIG. 2).

When the turntable 3 is in the position shown in FIG. 2, that is to say in a position in which the slot 4 is oriented at right angles to the contact surface of the stop 2, the catch pin 24 is resiliently urged by the leaf spring 23 into the bottom of the corresponding catch recess, as shown in FIGS. 2 and 3. In order to obtain a different miter position of the turntable 3, the clamping members 11 and 12 are released and the push rod 40 is displaced in the direction of the arrow 114 in FIG. 2, so that the catch bolt 24 moves out of the catch recess 35 and the spring 23 is then correspondingly resiliently deformed. The turntable 3 can now be rotated freely about the bolt 31, whereby the catch pin 24 moves out of the region of the catch recess. The user can then release the push rod 40, so that the leaf spring 23 presses the catch pin 24 against the inside of the annular rib 34, but a further rotation of the turntable 3 is not obstructed. Upon further rotation of the turntable 3, the catch pin 24 comes into engagement with the next catch recess 35 and is pressed into the bottom thereof by the spring 33.

In this position the turntable 3 is retained by the catch pin 24, and may be clamped in the selected position by means of the clamping members 11, 12 to further securely lock the turntable in place. As will be appreciated, clamping bolts 11, 12 can clamp the turntable 3 in any rotational position, apart from those rotational positions determined by the catch recesses 35.

The base plate 1 is preferably molded from a suitable plastic material, for example foam plastic. Although the rib 22 and leaf spring 23 are integrally molded with the base plate, the leaf spring is spaced a slight distance above the bottom wall 21, as can be seen in FIG. 3, to enable the leaf spring to flex in cantilever manner over, but parallel to, the bottom wall 21.

As will be apparent, the recesses 35 lie along an arc concentric with the central axis about which the turntable 3 is rotatable; and the catch pin 24 extends parallel to this central axis and is also perpendicular to the leaf spring 23 and the release element 40.

It will be appreciated that the preferred embodiment of the indexing arrangement described above has one portion, the rib 34, formed integrally with the turntable, and another portion, the spring 23, formed integrally with the base plate. Only a third, non-critical portion, the push rod 40, and the catch pin 24, are separately formed and assembled. Thus, this indexing arrangement is simple and inexpensive to manufacture, yet is accurate and reliable in operation.

The above described embodiments, of course, are not to be construed as limiting the breadth of the present invention. Modifications, and other alternative constructions, will be apparent which are within the spirit and scope of the invention as defined in the appended claims.

What is claimed is:

1. A chop saw, comprising:

a saw unit connected pivotably about a horizontal axis to a turntable mounted rotatably in a base plate about a vertical axis;

an indexing mechanism for releasably locating the turntable in any one of a plurality of specific rotational positions relative to the base plate; and said indexing mechanism comprising:

(a) catch recesses provided on an underside of said turntable along a circular arc, the centre of said arc lying on said vertical axis;

(b) a leaf spring mounted on said base plate and having a free end which is engageable with any selected one of said catch recesses upon rotation of said turntable; and (c) a release element mounted in said base plate and accessible from outside thereof, and operable to flex said leaf spring to move said free end out of engagement with any catch recess engaged thereby.

2. The chop saw of claim 1, wherein said base plate and said leaf spring are integrally molded from plastic material.

3. The chop saw of claim 1, wherein said free end of said leaf spring comprises a catch pin orientated at right angles to the longitudinal extent of said leaf spring, said catch pin being engageable with said recesses.

4. The chop saw of claim 3, wherein said release element has a bifurcated end in engagement with said catch pin, said release element being movable reciprocally substantially at right angles to both the longitudinal extent of said leaf spring and said catch pin.

5. The chop saw of claim 1, wherein said catch recesses are formed in a side face of an annular rib formed on and extending downwardly from said turntable.

6. The chop saw of claim 5, wherein said leaf spring extends substantially along a tangent to said annular rib.

7. The chop saw of claim 1, further comprising stops mounted on said base plate to limit flexing movement of said leaf spring.

8. The chop saw of claim 1, wherein stops are provided at circumferentially outer sides of end catch recesses on said circular arc, said stops limiting rotation of said turntable relative to said base plate.

9. The chop saw of claim 8, wherein said end catch recesses are spaced apart 90 degrees about said vertical axis.

10. A chop saw, comprising:

a base plate having a workpiece stop mounted thereon;

a turntable rotatably mounted in said base plate below said stop for rotation about a central axis;

a saw unit pivotally mounted on said turntable for pivoting movement about an axis transverse to said central axis;

an indexing mechanism for releasably locating said turntable in any one of a plurality of rotational positions relative to said base plate, and comprising catch recesses, a resilient member, and a release element;

said catch recesses being formed in said turntable and being spaced apart along an arc about said central axis;

said resilient member being mounted on said base plate in cantilever manner with a free end thereof being resiliently biased towards said arc for engaging said catch recesses;

said release element being mounted in said base plate for movement relative thereto between an inoperative position and an operative position, said release element flexing said resilient member in said operative position to move said free end out of engagement with any one of said catch recesses with which said free end was engaged;

said free end having a catch pin for engaging said recesses;

said resilient member comprising an arm integrally molded with said base plate from plastic material, and said catch pin being disposed parallel to said central axis;

said turntable having a rib integrally formed on the underside thereof, and said catch recesses being formed in said rib; and said catch recesses being formed in a side of said rib facing said central axis, and said arm extending generally tangentially to said arc.

11. The chop saw of claim 10, wherein said release element is elongate and slidably mounted in orifices in said base plate, one end of said release element extending outside said base plate for manual actuation thereof, and the other end of said release element being forked and engaging said catch pin.

12. A chop saw, comprising:

a base plate having a workpiece stop mounted thereon;

a turntable rotatably mounted in said base plate below said stop for rotation about a central axis;

a saw unit pivotally mounted on said turntable for pivoting movement about an axis transverse to said central axis;

an indexing mechanism for releasably locating said turntable in any one of a plurality of rotational positions relative to said base plate, and comprising catch recesses, a resilient member, and a release element;

said catch recesses being formed in said turntable and being spaced apart along an arc about said central axis;

said resilient member being mounted on said base plate in cantilever manner with a free end thereof being resiliently biased towards said arc for engaging said catch recesses;

said release element being mounted in said base plate for movement relative thereto between an inoperative position and an operative position, said release element flexing said resilient member in said operative position to move said free end out of engagement with any one of said catch recesses with which said free end was engaged; and said base plate having stops between which said resilient member extends and which limit flexing movement of said resilient member.

13. A chop saw, comprising:

a base plate having a workpiece stop mounted thereon;

a turntable rotatably mounted in said base plate below said stop for rotation about a central axis;

a saw unit pivotally mounted on said turntable for pivoting movement about an axis transverse to said central axis;

an indexing mechanism for releasably locating said turntable in any one of a plurality of rotational positions relative to said base plate, and comprising catch recesses, a resilient member, and a release element;

said catch recesses being formed in said turntable and being spaced apart along an arc about said central axis;

said resilient member being mounted on said base plate in cantilever manner with a free end thereof being resiliently biased towards said arc for engaging said catch recesses;

said release element being mounted in said base plate for movement relative thereto between an inoperative position and an operative position, said release element flexing said resilient member in said operative position to move said free end out of engagement with any one of said catch recesses with which said free end was engaged;

an annular rib formed on said turntable concentric with said central axis, said catch recesses being formed in said rib; and stops formed on said rib for engagement with said free end in the operative position of said release element for limiting the extent of rotational movement of said turntable relative to said base plate.

14. A chop saw, comprising:

a base plate having a circular recess therein;

a turntable rotatably mounted in said recess for rotation about a central axis and having a surface for supporting a workpiece;

a saw unit mounted on said turntable and pivotal relative thereto about an axis transverse to said central axis;

a series of catch recesses associated with said turntable below said surface, said catch recesses being spaced apart along a circular arc concentric with said central axis;

a flexible arm cantilevered from said base plate and extending tangentially to said arc, the distal end of said cantilevered arm being resiliently biased towards said arc and being formed with means for engaging in said recesses to locate rotational positions of said turntable relative to said base plate;

stop means, mounted on said turntable and cooperative with said engaging means, for limiting the extent of rotational movement of said turntable relative to said base plate;

release means, mounted in said base plate and manually operable from outside said base plate, for flexing said cantilevered arm and releasably holding said engaging means in an inoperative position in which said engaging means is spaced from said arc in disengagement from said recesses and said turntable can be rotated until limited by said stop means; and clamping means for clamping said turntable in any rotational position thereof including any position located by engagement of said engaging means in any one of said catch recesses.

* * * * *